United States Patent [19]

Parker

[11] Patent Number: 5,067,580
[45] Date of Patent: Nov. 26, 1991

[54] ANTI-SHAFT EFFECT MOTORCYCLE SUSPENSION

[76] Inventor: James Parker, 102 So. Capitol, Santa Fe, N. Mex. 87501

[21] Appl. No.: 570,214

[22] Filed: Aug. 21, 1990

Related U.S. Application Data

[63] Continuation of Ser. No. 196,348, May 20, 1988, abandoned.

[51] Int. Cl.$^5$ ...................... B62K 25/20; B62M 17/00
[52] U.S. Cl. .................................... 180/219; 180/226; 180/227
[58] Field of Search .................... 180/226, 227, 219

[56] References Cited

U.S. PATENT DOCUMENTS

| | | | |
|---|---|---|---|
| 3,817,342 | 6/1974 | Hamilton | 180/227 |
| 4,434,868 | 3/1984 | Brenner et al. | 180/226 |
| 4,951,791 | 8/1990 | Belil Creixell | 180/227 |

FOREIGN PATENT DOCUMENTS

| | | | |
|---|---|---|---|
| 1055981 | 4/1959 | Fed. Rep. of Germany | 180/226 |
| 3811889 | 10/1989 | Fed. Rep. of Germany | 180/226 |

*Primary Examiner*—Mitchell J. Hill
*Attorney, Agent, or Firm*—Louis J. Bachand

[57] ABSTRACT

A shaft driven motorcycle rear wheel suspension in which reactive energy in the gear housing is directed into the frame and away from the damping unit is provided by a four bar arrangement having the swing arm 28 connected to the gear housing 22 at a point 32 offset from the rear wheel axle 50, a link arm 38 above the swing arm and connected at the wheel axle, and bars 36, 40 interconnecting the swing arm and the link arm.

11 Claims, 1 Drawing Sheet

ANTI-SHAFT EFFECT MOTORCYCLE SUSPENSION

This application is a continuation of application Ser. No. 07/196,348, filed May 20, 1988, now abandoned.

TECHNICAL FIELD

This invention relates to motorcycles having shaft driven rear wheels, and more particularly to rear suspensions for such motorcycles. The invention minimizes or eliminates the "shaft effect" commonly experienced in shaft driven motorcycles as a result of reactive energy induced in the gear housing during acceleration and deceleration of the motorcycle. The shaft effect has been characteristic of shaft driven motorcycles and has resulted in sudden, erratic and dramatic shifts in the load condition of the suspension which can cause the rider to lose control.

BACKGROUND OF THE INVENTION

The problem of shaft effect has been the subject of magazine articles, see for example "Manners For The V-Max" in *Motorcyclist*, September 1987, pages 53–55. U.S. Pat. No. 4,336,859 to Leitner addresses the problem and suggests the use of an articulated arm in addition to the swing arm. In the *Motorcyclist* article, the author described shaft effect as "an unwanted by-product of any shaft-drive motorcycle's drive train set-up; simply put it's the tendency of the rear suspension to rise, sometimes violently, with the application of power to the rear wheel and fall, sometimes violently, under engine braking. Shaft effect happens because the swing arm and shaft housing of shaft drive bikes are called on to withstand massive amounts of torque when power is applied. The shaft housing is trying to rotate backward as the wheel is propelled forward, and the only thing that is stopping the shaft housing from spinning is its connection to the frame via the swing arm and driveshaft tube. If there were no rear suspension, the load would be resolved in the frame . . . (but) because the rear wheel of a modern motorcycle is free to pivot up and down on the swing arm, controlled by the spring-damper unit or units, the torque effect at the shaft housing acts to extend the rear suspension, sometimes hard enough to top it out or make the rear suspension essentially rigid. Thus the rear suspension action of a driveshaft machine . . . behaves one way with the throttle open and another with the throttle closed. If rear-wheel traction is lost for an instant, as it might be when hitting oil, sand or water while accelerating hard and cornering, the suspension can go through wild cycles of wheel hop, or at least vary greatly in stiffness, in the space of a couple of seconds."

The advantages of drive-shaft motorcycles are thus unfortunately accompanied by the major disadvantage of unpredictable suspension action, as a result of shaft effect.

SUMMARY OF THE INVENTION

It is accordingly an object of the invention to provide an improved rear wheel suspension for a motorcycle. It is another object to provide a means for moderating and eliminating the shaft effect from shaft driven motorcycles. It is another object to direct the reactive energy induced in the gear housing during motorcycle acceleration and deceleration into the motorcycle frame and away from the suspension damper where it exeracerbates up and down movements of the motorcycle by extreme loading or unloading the suspension damper. In the frame the reactive energy is dissipated with no effect on rider control. It is another object to provide a rear wheel suspension with these properties which is simply constructed, rugged and durable. It is a still further object to provide a rear wheel suspension which is particularly adapted to single side mounted rear wheels. Another object is to provide a suspension in which side forces on the swing arm in single side suspensions are compensated by an opposite force on a parallel arm.

These and other objects of the invention are realized in accordance therewith in an anti-shaft effect suspension for a motorcycle having a frame, a front wheel, and a rear wheel driven by a shaft having a ring and pinion gear arrangement within a housing coaxial with the rear wheel axle in a manner tending to induce shaft effect-producing reactive energy in the housing upon acceleration or deceleration of the motorcycle, the suspension comprising a swing arm and a link arm coupled between said frame and housing in a manner to direct acceleration and deceleration induced reactive energy in the housing into the frame in shaft effect blocking relation.

In particular embodiments, the swing arm is pivoted at the frame and pivoted at the housing in rear wheel axle offset relation; the link arm is in paired relation with the swing arm and spaced above the swing arm and pivoted at the frame and at the axle of the rear wheel; the swing arm and the link arm are joined by a pair of bars defined respectively by the frame and the housing, the bars being generally vertically disposed and respectively at greater or less than a 90° angle to the link arm at the frame; the swing arm, link arm, and bars preferably describe a parallelogram, and there is further included damping means acting on the swing arm.

In addition, preferably the link arm lies in substantially the same horizontal plane as the shaft; the shaft is pivoted at the housing offset from the link arm pivot; and the rear wheel is supported from one side only.

In another embodiment the invention provides an anti-shaft effect suspension for a motorcycle having a frame, a front wheel, and a rear wheel driven by a shaft having a ring and pinion gear arrangement within a housing coaxial with the rear wheel axle in a manner tending to induce shaft effect producing reactive energy in the housing upon acceleration or deceleration of the motorcycle, the suspension comprising a generally horizontally disposed swing arm pivotally mounted on the housing in offset relation relative to the rear wheel axle at its outer end and pivotally mounted to the frame at its inner end, a generally horizontally disposed rigid link arm spaced above the swing arm pivotally mounted on the frame at its inner end and pivotally mounted at the axle of the rear wheel at its outer end, damping means disposed to act upon the swing arm, and a pair of generally vertically disposed, generally parallel bars defined by intervening portions of the housing and the frame between respective inner and outer ends of the swing arm and the link, whereby reactive energy in the housing is directed into the frame and away from the damping means by the bars maintaining the swing arm and link arm in their the spaced relation.

In this and like embodiments, the link arm lies in substantially the same horizontal plane as the shaft; the shaft is pivoted at the housing offset from the link arm pivot; and the rear wheel may be supported from one side only.

In a particularly preferred embodiment the invention contemplates an anti-shaft effect suspension for a motorcycle having a frame, a front wheel, and a rear wheel driven by a shaft having a ring and pinion gear arrangement within a housing coaxial with the rear wheel axle in a manner tending to induce shaft effect producing reactive energy in the housing upon acceleration or deceleration of the motorcycle, the suspension comprising a generally horizontally disposed swing arm pivotally mounted on the housing in offset relation relative to the rear wheel axle at its outer end and pivotally mounted to the frame at its inner end, a generally horizontally disposed rigid link arm parallel to and spaced above the swing arm pivotally mounted on the frame at its inner end and pivotally mounted at the axle of the rear wheel at its outer end, a shock absorber disposed between the frame and the suspension arm to act upon the swing arm, and a pair of generally vertically disposed, generally parallel bars defined by intervening portions of the housing and the frame between respective inner and outer ends of the swing arm and the link to form a parallelogram with the swing and link arms, whereby reactive energy in the housing is directed into the frame and away from the damping means by the bars maintaining the swing arm and link arm in their spaced relation.

BRIEF DESCRIPTION OF THE DRAWING

The invention will be further described as to an illustrative embodiment in conjunction with the attached drawings in which.

DESCRIPTION OF THE PREFERRED EMBODIMENTS

As noted above the invention provides a four bar linkage between the gear housing and the frame composed of generally horizontal link and swing arms and generally vertical bars. The bars are defined by the housing at the rear of the motorcycle and by the frame ahead of the rear wheel. The action of the linkage is to keep the swing arm and link arm parallel as the housing attempts to rotate. The effect is to direct the reactive energy in the housing into the frame. This avoids loading the suspension damper, and thereby topping out the suspension and its dangerous consequences for the rider.

Figure 1:
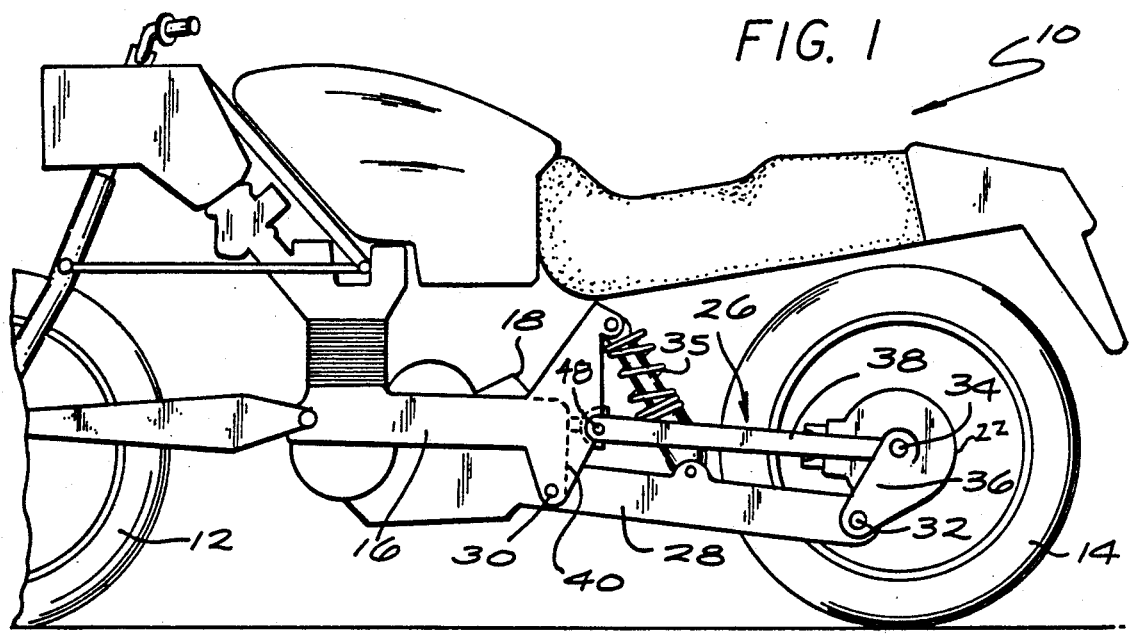
FIG. 1 is a side elevation view of the motorcycle with the new suspension fitted.
Figure 2:
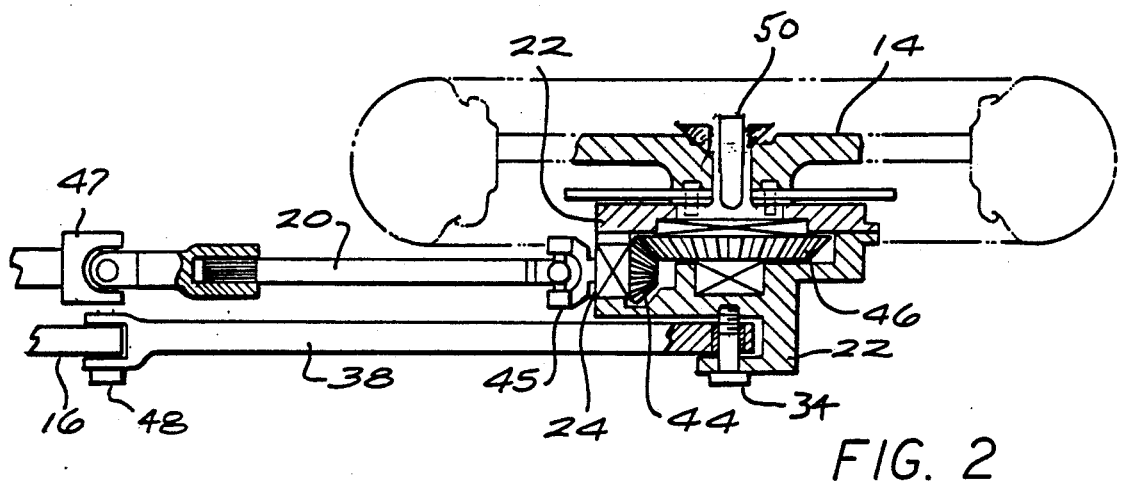
FIG. 2 is a horizontal section of the suspension showing the link arm and drive shaft and with the swingarm omitted for clarity; and, FIG. 3 is a view like FIG. 2 with the swingarm shown and the link arm and drive shaft omitted.
Figure 3:
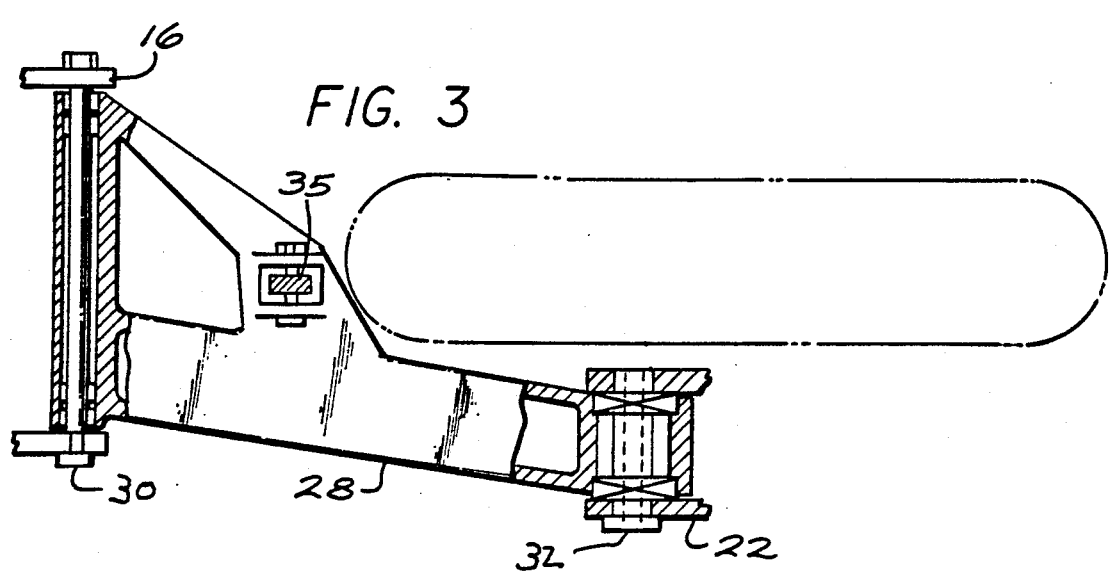

With reference to FIG. 1, 2 and 3, the motorcycle is shown at 10 and comprises inter alia a front wheel 12, a rear wheel 14, a frame 16, an engine 18 and a drive shaft 20 which approaches gear housing 22 at 24. The suspension is indicated at 26; it comprises a swing arm 28 which is pivoted to the frame at pivot 30 and to the housing at pivot 32. It is to be noted that the swing arm 28 pivot 32 is offset from the wheel axle 50, and that the offset distance and direction defines a rearwardly sloped bar 36 on the housing 22 extending from the pivot point of the swing arm on the housing to the rear wheel axle 50. A damper unit 35 comprising a coil over shock arrangement is coupled to the swing arm 28 approximately midway along its length and at the unit upper end to the frame (which term includes the engine 18). It is an advantage of the present suspension that rising rate and other types of effects are available because the damper units are placed on the swing arm rather than at the rear wheel axle or at the housing.

The link arm 38 is parallel with and spaced above the swing arm 28. It is further coplanar with the drive shaft The rearward terminus of the link arm pivot 34 which is coaxial with the rear wheel axle 50, forming, a coupling with the bar 36 as shown. The offset relation of the rearward terminals at 32 and 34 respectively, of the swing arm 28 and the link 38 is important in obtaining the housing 22 reactive energy control characteristic of the invention. The forward terminal of link 38 is at pivot 48.

The remaining bar 40 is formed by the frame 16 portion between the forward terminals at pivots 30, 48 respectively, of the swing arm 28 and the link 38. It will be observed that in the preferred embodiment shown, the bars 36, 40 are generally vertically disposed and form a parallel pair; the swing arm 28 and link 38 also form a parallel pair at an angle to the bar pair.

The resulting parallelogram acts to keep the swing arm 28 and link arm 38 parallel as forces on the arms are translated into horizontal force from vertical force. In this manner the damper unit 35 does not become exposed to forces which will cause it to top out; such forces are dissipated into the frame 16.

The shaft drive arrangement shown is conventional and includes a pinion gear 44 coupled to the shaft 20 through a universal joint 45, and a ring gear 46 which is fixed to the rear wheel 14. The wheel 14 is driven by the shaft 20 being rotated by the engine 18 through universal joint 47, the pinion gear 44 rotating with the shaft, and the ring gear being driven thereby. Reactive forces on the housing 22 come as a reaction to the action of the wheel 14 rapidly accelerating or decelerating.

The disclosed embodiment is a single side suspension in which the swing arm 28 extends to one side of the rear wheel 14, and no fork is used. The present suspension is peculiarly adapted to a single side installation because it has no complicated bearing requirements at the wheel axle 34, by virtue of placing the swing arm below the drive shaft 20, and attaching it in pivoting relation at the lower portion of the housing 22.

In addition, the side forces experienced by the swing arm 28 as a result of one-sided mounting of the wheel 14, induced by the wheel rotating on the ground, is compensated by link arm 38 side forces induced by the tendency of the housing 22 to rotate counter to the wheel.

The angles between the respective adjacent arms of the suspension are not narrowly critical provided the relationship of vertical force on the swing arm being directed into the frame as a result of holding the swing arm substantially parallel with the link arm sufficiently to control undesirable shaft effects is maintained.

In operation the onset of shaft effect inducing reactive energy development in the housing 22 is met by the swing arm 28 trying to move vertically, and the combination of the bars 36, 40 and link 38 together blocking such movement by constraining the swing arm to remain parallel with the link arm. The upward force is thus thrust into the frame where it is no danger to the rider.

I claim:

1. Anti-shaft effect single side suspension for a motorcycle having a frame, a front wheel, a rear wheel axle, and a rear wheel driven by a shaft having a ring and pinion gear arrangement within a housing coaxial with said rear wheel axle, said suspension comprising a swing arm, a link arm, and a pair of substantially parallel bars in a four bar linkage to direct acceleration and deceleration induced reactive energy in said housing into said frame in shaft effect blocking relation, said swing arm being pivoted at said frame and pivoted at said housing and connecting said rear wheel to said frame, said swing arm pivot at said housing being in offset relation to the axle of said rear wheel, said link arm being pivoted at said frame and at said axle, and spaced above said swing arm.

2. Anti-shaft effect suspension for a motorcycle according to claim 1, in which said swing arm and said link arm are joined by said pair of bars defined respectively by said frame and said housing, said bars being generally vertically disposed and respectively at greater or less than a 90 degree angle to said link arm at said frame.

3. Anti-shaft effect suspension for a motorcycle according to claim 2 in which said swing arm, said link arm and said pair of bars are arranged as a parallelogram.

4. Anti-shaft effect suspension for a motorcycle according to claim 2, including also means acting to damp movement of said swing arm.

5. Anti-shaft effect suspension for a motorcycle according to claim 4, in which said link arm lies in substantially the same horizontal plane as said shaft.

6. Anti-shaft effect suspension for a motorcycle according to claim 3, in which said shaft is pivoted at said housing offset from the pivot of said link arm.

7. Anti-shaft effect, single side rear wheel suspension for a motorcycle having a frame, a front wheel, a rear wheel axle, and a rear wheel driven by an engine rotated shaft having a ring and pinion gear arrangement within a housing coaxial with said rear wheel axle, said suspension comprising a generally horizontally disposed swing arm pivotally mounted on said housing in offset relation relative to said rear wheel axle at its outer end and pivotally mounted to said frame at its inner end, a generally horizontally disposed rigid link arm spaced above said swing arm pivotally mounted on said frame at its inner end and pivotally mounted at the axle of said rear wheel at its outer end, damping means disposed to act upon said swing arm, and a pair of generally vertically disposed, generally parallel bars defined by portions of said housing and said frame between respective inner and outer ends of said swing arm and said link arm, whereby reactive energy in said housing is directed into said frame and away from said damping means by said bars maintaining said swing arm and said link arm in their said spaced relation.

8. Anti-shaft effect suspension for a motorcycle according to claim 7, in which said link arm lies in substantially the same horizontal plane as said shaft.

9. Anti-shaft effect suspension for a motorcycle according to claim 7, in which said shaft is pivoted at said housing horizontally offset from said link arm pivot.

10. Anti-shaft effect suspension for a motorcycle according to claim 8, in which said shaft is pivoted at said housing offset from said link arm pivot.

11. Anti-shaft effect, single side suspension for a motorcycle having a frame, a front wheel, a rear wheel axle, and a rear wheel driven by a shaft having a ring and pinion gear arrangement within a housing coaxial with said rear wheel axle, said suspension comprising a generally horizontally disposed swing arm pivotally mounted on said housing in offset relation relative to said rear wheel axle at its outer end and pivotally mounted to said frame at its inner end, a generally horizontally disposed rigid link arm parallel to and spaced above said swing arm pivotally mounted on said frame at its inner end and pivotally mounted at the axle of said rear wheel at its outer end, a shock absorber disposed between said frame and said swing arm to act upon said swing arm, and a pair of generally vertically disposed, generally parallel bars defined by portions of said housing and said frame between respective inner and outer ends of said swing arm and said link arm to form a parallelogram with said swing arm and said link arm, whereby reactive energy in said housing is directed into said frame and away from said damping means by said bars maintaining said swing arm and said link arm in their said spaced relation.

* * * * *